US009336414B2

(12) United States Patent
Folscheid

(10) Patent No.: US 9,336,414 B2
(45) Date of Patent: May 10, 2016

(54) METHOD OF ACTIVATING A MECHANISM, AND DEVICE IMPLEMENTING SUCH A METHOD

(75) Inventor: Bruno Folscheid, Le Chesnay (FR)

(73) Assignee: CASSIDIAN SAS, Elancourt (FR)

( * ) Notice: Subject to any disclaimer, the term of this patent is extended or adjusted under 35 U.S.C. 154(b) by 545 days.

(21) Appl. No.: 13/329,602

(22) Filed: Dec. 21, 2011

(65) Prior Publication Data

US 2012/0165961 A1   Jun. 28, 2012

(30) Foreign Application Priority Data

Dec. 22, 2010   (FR) ...................................... 10 61042

(51) Int. Cl.
*G05B 15/02*   (2006.01)
*G06F 21/81*   (2013.01)

(52) U.S. Cl.
CPC ...................................... *G06F 21/81* (2013.01)

(58) Field of Classification Search
CPC ......... G06F 21/81; H04M 1/673; G05B 15/02
USPC ........................................................... 700/17
See application file for complete search history.

(56) References Cited

U.S. PATENT DOCUMENTS 5,266,942 A * 11/1993 Stoller .......................... 340/5.74
5,448,045 A *  9/1995 Clark ............................. 235/382

(Continued)

FOREIGN PATENT DOCUMENTS

JP   20000-163201   *  6/2000   ................ G06F 3/02

OTHER PUBLICATIONS

Nokia, "Nokia 636 Owner's Manual", http://www.nokiausa.com/get-support-and-software/product-support/nokia-63-6/user-guides Dec. 19, 1996, pp. 4.*

(Continued)

*Primary Examiner* — Carlos Ortiz Rodriguez
*Assistant Examiner* — Olvin Lopez Alvarez
(74) *Attorney, Agent, or Firm* — Greer, Burns & Crain, Ltd.

(57) ABSTRACT

A method of activating a function such as unlocking a mobile telephone keypad by an instruction sequence $\{x_i, \ldots, x_n\}$ of a length n given to a user, who validates the sequence to activate the function. The instruction sequence is determined randomly, and for each instruction $x_i$, the method includes: sending an instruction $x_i$ to the user; receiving a response $y_i$ from the user; analysis for validation of instruction $x_i$; instruction $x_i$ is said to be validated when $y_i$ is a valid response for $x_i$ and the time elapsed between the sending of $x_i$ and the receipt of $y_i$ is shorter than a set period $\Delta_i$; if instruction $x_i$ is not validated then the function is not activated; sending the next instruction, if any, after validation of $x_i$; activating the function when at least the last instruction sent is validated.

10 Claims, 3 Drawing Sheets

(56) References Cited

U.S. PATENT DOCUMENTS

| | | | |
|---|---|---|---|
| 5,636,281 A * | 6/1997 | Antonini | 705/55 |
| 6,109,925 A * | 8/2000 | Druckman et al. | 434/236 |
| 6,134,659 A * | 10/2000 | Sprong et al. | 713/190 |
| 6,145,053 A * | 11/2000 | Smith | 711/112 |
| 6,193,606 B1 * | 2/2001 | Walker et al. | 463/20 |
| 6,195,698 B1 * | 2/2001 | Lillibridge et al. | 709/225 |
| 6,374,036 B1 * | 4/2002 | Ryan et al. | 386/261 |
| 6,490,353 B1 * | 12/2002 | Tan | 380/37 |
| 7,243,027 B2 * | 7/2007 | Ireland et al. | 702/6 |
| 7,475,252 B2 * | 1/2009 | Jeffries et al. | 713/184 |
| 7,743,256 B2 * | 6/2010 | Yang | 713/182 |
| 8,009,828 B2 * | 8/2011 | Furukawa | 380/28 |
| 2002/0091946 A1 * | 7/2002 | Satoh | 713/202 |
| 2002/0186688 A1 * | 12/2002 | Inoue et al. | 370/352 |
| 2003/0165184 A1 * | 9/2003 | Welborn et al. | 375/146 |
| 2005/0143059 A1 * | 6/2005 | Imura | 455/419 |
| 2005/0254650 A1 * | 11/2005 | Sakurai et al. | 380/268 |
| 2006/0046694 A1 * | 3/2006 | Yu | 455/411 |
| 2007/0021168 A1 * | 1/2007 | Chamizer et al. | 463/7 |
| 2007/0027718 A1 * | 2/2007 | Amerantes et al. | 705/3 |
| 2007/0038447 A1 * | 2/2007 | Kaneko | 704/239 |
| 2007/0219958 A1 * | 9/2007 | Park et al. | 707/3 |
| 2007/0281748 A1 | 12/2007 | Piekarski | |
| 2008/0005566 A1 * | 1/2008 | Morita | 713/171 |
| 2008/0021696 A1 * | 1/2008 | Bartelt et al. | 703/27 |
| 2008/0058047 A1 * | 3/2008 | Duhamel | 463/11 |
| 2008/0120436 A1 * | 5/2008 | Cowgill et al. | 710/2 |
| 2008/0183901 A1 * | 7/2008 | Cardona et al. | 709/250 |
| 2009/0046541 A1 * | 2/2009 | Chou et al. | 368/262 |
| 2009/0164373 A1 * | 6/2009 | Blythe | 705/44 |
| 2009/0220216 A1 * | 9/2009 | Marsh et al. | 386/124 |
| 2010/0178956 A1 * | 7/2010 | Safadi | 455/563 |
| 2010/0254525 A1 | 10/2010 | Maly et al. | |
| 2011/0154268 A1 * | 6/2011 | Trent et al. | 715/863 |
| 2011/0260829 A1 * | 10/2011 | Lee | 340/5.51 |
| 2013/0305033 A1 * | 11/2013 | Lacson et al. | 713/150 |
| 2013/0312077 A1 * | 11/2013 | Basson et al. | 726/9 |

OTHER PUBLICATIONS

Standards Schmandards, "proposal for an accessible Captcha", http://www.standards-schmandards.com/2005/captcha/, 2005, pp. 10.*

Gupta et al, "Sequenced Tagged Captcha: Generation and its Analysis", IEEE, Mar. 2009, pp. 1286-1291.*

* cited by examiner

METHOD OF ACTIVATING A MECHANISM, AND DEVICE IMPLEMENTING SUCH A METHOD

TECHNICAL FIELD

The present invention relates to the field of human-machine interface systems.

The invention relates more particularly to the activation of a mechanism while confirming the presence and will of the user.

The invention is particularly applicable, but not limited to, the validation of the presence and will of a user to unlock a mechanism located on an appliance comprising a human-machine interface, such as a mobile telephone.

BACKGROUND

In a known manner, a mechanism operating on an appliance can be activated by:
- a dialogue box asking the user to confirm his intention; on a mobile telephone for example, the keypad switches to locked mode after a certain length of time, i.e. simply pressing a key on the keypad does not trigger the anticipated action as unlocking requires that several predetermined keys be pressed successively in a predefined sequence;
- entry of a password, as is the case for activating the unlocking mechanism of a session on a computer, mobile telephone or communication device (PDA, etc.);
- use of a code located in a "keychain" accessible by the appliance after user authorization.

A major drawback of activating a mechanism using the first or second type of method is that the activation of the mechanism does not check the will of the user. Such entry can become a reflex action.

The major drawback of the third type of method is that the user cannot necessarily remember the applications that he has authorized to access his keychain and that the request for authorization to use one of his keys (password, for example) is not submitted to it.

SUMMARY

The object of the invention is to overcome the drawbacks of the state of the art by proposing a solution that allows for validation of the user's intention and characterization of the user's presence and/or will to activate a mechanism.

Advantageously, this characterization is made possible by the generation of a sequence of random instructions. The user must give a response to each instruction within a set period. The total period spent validating the entire sequence can also be limited to another set period.

To this end, the present invention relates to a method of activating a mechanism by means of an instruction sequence $\{x_i, \ldots, x_n\}$ of a length n given to a user, who must validate the sequence to activate said mechanism. According to the invention, the instruction sequence $\{x_i, \ldots, x_n\}$ is determined randomly, and for each instruction $x_i$, the method comprises the steps of:
- sending an instruction $x_i$ to the user,
- receiving a response $y_i$ from the user,
- analysis for validation of instruction $x_i$; instruction $x_i$ is said to be validated when $y_i$ is a valid response for $x_i$ and the time elapsed between the sending of $x_i$ and the receipt of $y_i$ is shorter than a set period $\Delta_i$; if instruction $x_i$ is not validated, then the mechanism is not activated;
- sending the next instruction, if any, after validation of $x_i$;
- activating the mechanism when at least the last instruction sent is validated.

With the method according to the invention, the random character no longer allows for unconscious activation of the mechanism. Insofar as the sequence, which is a timed succession of instructions, changes on each attempt, the method according to the invention fully requires the will of the user and his genuine intention to activate the mechanism is thus validated. Furthermore, the method according to the invention prevents any involuntary operation. On a mobile telephone for example, no function such as activating the keypad can take place unintentionally.

According to an advantageous characteristic of the invention, the mechanism can be activated when at least the last instruction is validated and a period set as a function of each amount of time elapsed between the sending of an instruction $x_i$ and the receipt of a corresponding response $y_i$ is shorter than a set period $\Delta$. A global timeout is thus introduced, which can be an additional constraint allowing for the period during which it is possible to enter all or some of the responses to be limited.

According to a first variant of the invention, the random sequence can be predetermined. That is, the instructions are randomly predefined before the sending of the whole sequence starts. To this end, each time the method is initialized, a random sequence can be determined and then the instructions can be sent one by one.

According to another advantageous variant of the invention, each instruction can be randomly determined just before it is sent.

As a non-limitative example, the random function can be a pseudo-random function supplied by an operating system or the use of a decimal of a processor's reference hourly tick. Distribution can be uniform over all of the values, but another type of distribution can be chosen as necessary.

Advantageously, n is chosen, particularly randomly, from the range $[n_1, n_2]$ where $n_1$ and $n_2$ depend on the mechanism. The length n can depend on the criticality of starting the mechanism. This length can for example be short when the user wishes to unlock his mobile telephone, for example $n_1$ and $n_2$ can equal two and five respectively, and longer when the user wishes to delete his address book, for example $n_1$ and $n_2$ can equal five and ten respectively. Other ranges can of course be envisaged.

According to an advantageous characteristic of the invention, at least one instruction $x_i$ is a visual instruction. A visual instruction can have the function of indicating or designating a component such as a key on a keypad.

An instruction $x_i$ can also be at least one audio instruction to the user. For example, the instruction can be the name of a letter, digit or colour, or the description of a movement to make (these examples are not limitative).

A response $y_i$ can be at least one response of contact with a device such as a keypad, a touch screen or any interface device between the user and the appliance that implements the mechanism. For example, the response can be the pressure of a finger on a key, a touch or a movement made on said interface device, or in other words a response of contact by selection of a key on said interface device.

With the method according to the invention, the mechanism to be activated can be a function or application task internal to the appliance that implements the method according to the invention. A function can also be the activation of an interface device such as a mechanical keypad or a touch screen keypad.

It can also be envisaged that an instruction $x_i$ is a question, possibly with multiple responses. A response $y_i$ will then be valid if it is one of the valid responses for that question.

Preferably, according to an embodiment of the invention, the instruction sequence $\{x_1, \ldots, x_n\}$ can comprise a series of keys on a keypad, the sending of an instruction consisting of indicating a corresponding key by the emission of light. The emission of light can be the backlighting of the corresponding key or the lighting of a light-emitting diode designating the corresponding key. For a mobile telephone keypad for example, the keypad can be unlocked by pressing on each key that is backlit in a random sequence. With each press, the user confirms that he has seen the key lit up. Correctly pressing the entire sequence validates keypad unlocking.

According to another aspect of the invention, a device or appliance is proposed that implements a mechanism activation method by means of an instruction sequence $\{x_i, \ldots, x_n\}$ of a length n given to a user, who must validate the sequence to activate said mechanism.

This device comprises a processing unit configured to determine the instruction sequence $\{x_i, \ldots, x_n\}$ randomly, and for each instruction $x_i$:
send an instruction $x_i$ to the user,
receive a response $y_i$ from the user,
analyse in order to validate instruction $x_i$; instruction $x_i$ is said to be validated when $y_i$ is a valid response for $x_i$ and the time elapsed between the sending of $x_i$ and the receipt of $y_i$ is shorter than a set period $\Delta_i$; if instruction $x_i$ is not validated, then the mechanism is not activated;
send the next instruction, if any, after validation of $x_i$;
activate the mechanism when at least the last instruction sent is validated.

Of course, the different characteristics, forms and variants of the invention can be associated with each other in a variety of combinations insofar as they are not incompatible or mutually exclusive.

BRIEF DESCRIPTION OF THE DRAWINGS

Further advantages and characteristics of the invention will become apparent on examining the detailed description of an embodiment, which is in no way limitative, and the attached drawings, in which.

DETAILED DESCRIPTION

Figure 1:
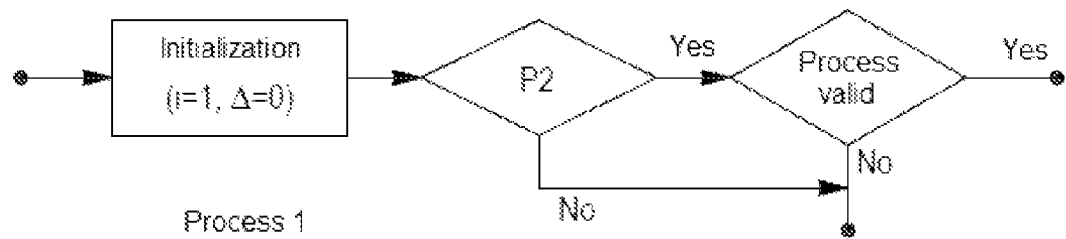
FIG. 1 is a view showing a global validation process of the method according to the invention.

FIG. 1 sets out process 1, abbreviated to P1.

P1 starts with an initialisation step. A global timeout can be initialized in this step. An instruction sequence can be predetermined or not. A variable i is initialized to the value 1. A variable n is initialized. When the instruction sequence is predetermined, the variable n is equal to the length of the instruction sequence. If the variable n is not predefined, it is initialized to a random value, a natural integer of between $n_1$ and $n_2$ depending on the application.

Figure 2:
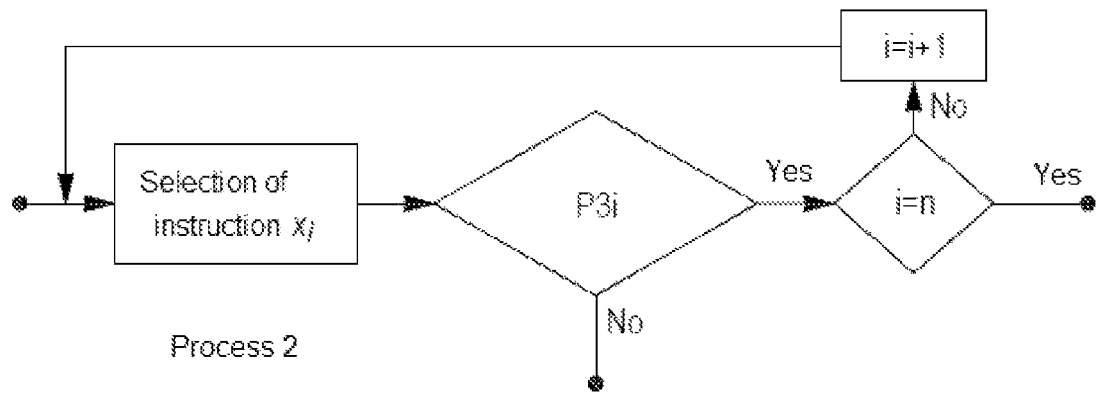
FIG. 2 is a view showing a succession of instructions according to the invention.

P1 continues with the running of a process 2, abbreviated to P2, and is described in FIG. 2 for the successive sending of the instructions.

When the result of P2 is "yes", that is, the last instruction is validated, P1 continues with the process validation step. The process is validated when at least P2 has "yes" as the result. An additional, non-limitative validation condition can be the validation of the global timeout if it has been initialized. When the process is validated, it ends with the output that has "yes" as the result. Otherwise, it ends with the output that has "no" as the result. More specifically, P2 in FIG. 2 has one input and two outputs. One output has "yes" as the result.

The other has "no" as the result.

P2 starts with the selection of the instruction relative to the variable i.
when P1 has not predetermined the instruction sequence, the instruction selection consists of the random generation of instruction $x_i$;
when P1 has predetermined the instruction sequence, the instruction selection consists of the selection of the i-th instruction in the instruction sequence.

Figure 3:
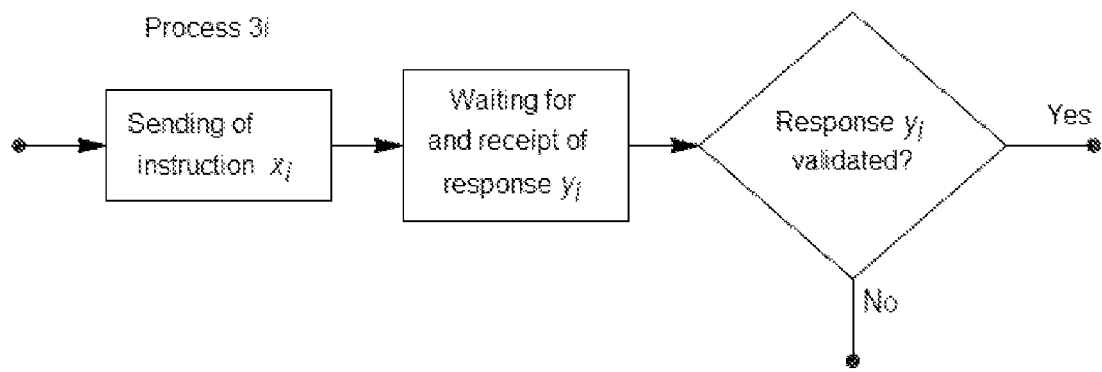
FIG. 3 is a view showing a validation process of an instruction according to the invention.

P2 continues by running process 3i, abbreviated to P3i, which is described in FIG. 3. When the result of P3i is "yes", P2 continues with a step of comparing the value of the variable i with the value of the variable n, initialized by P1.
if the variable i is different from the variable n, then the variable i is incremented and process 2 continues with the selection of the instruction relative to the new variable i;
otherwise, process 2 ends with the output that has "yes" as the result.

In FIG. 3, P3i comprises an input and two outputs. One output has "yes" as the result. The other has "no" as the result.

P3i starts by sending instruction $x_i$. The instruction sent can consist of, without being limited to, the switching on of the backlighting of a keypad key or a screen region. It can also be an audio announcement such as the name of a keypad key or the description of a movement.

P3i continues by waiting for a response from the user. The response can consist of, without being limited to, pressing a key on the keypad in response to the instruction, selecting a screen region, or a voice response. When the response is received, the P3i process determines whether instruction $x_i$ has been validated. It is validated when the response received is valid and the user has responded within the set time. If the instruction is validated, process P3i ends with the output "yes". Otherwise, it ends with the output "no".

A method according to the invention implemented in an unlocking mechanism for a mobile telephone keypad 16 will now be described with reference to FIGS. 4 to 7.

Figure 4:
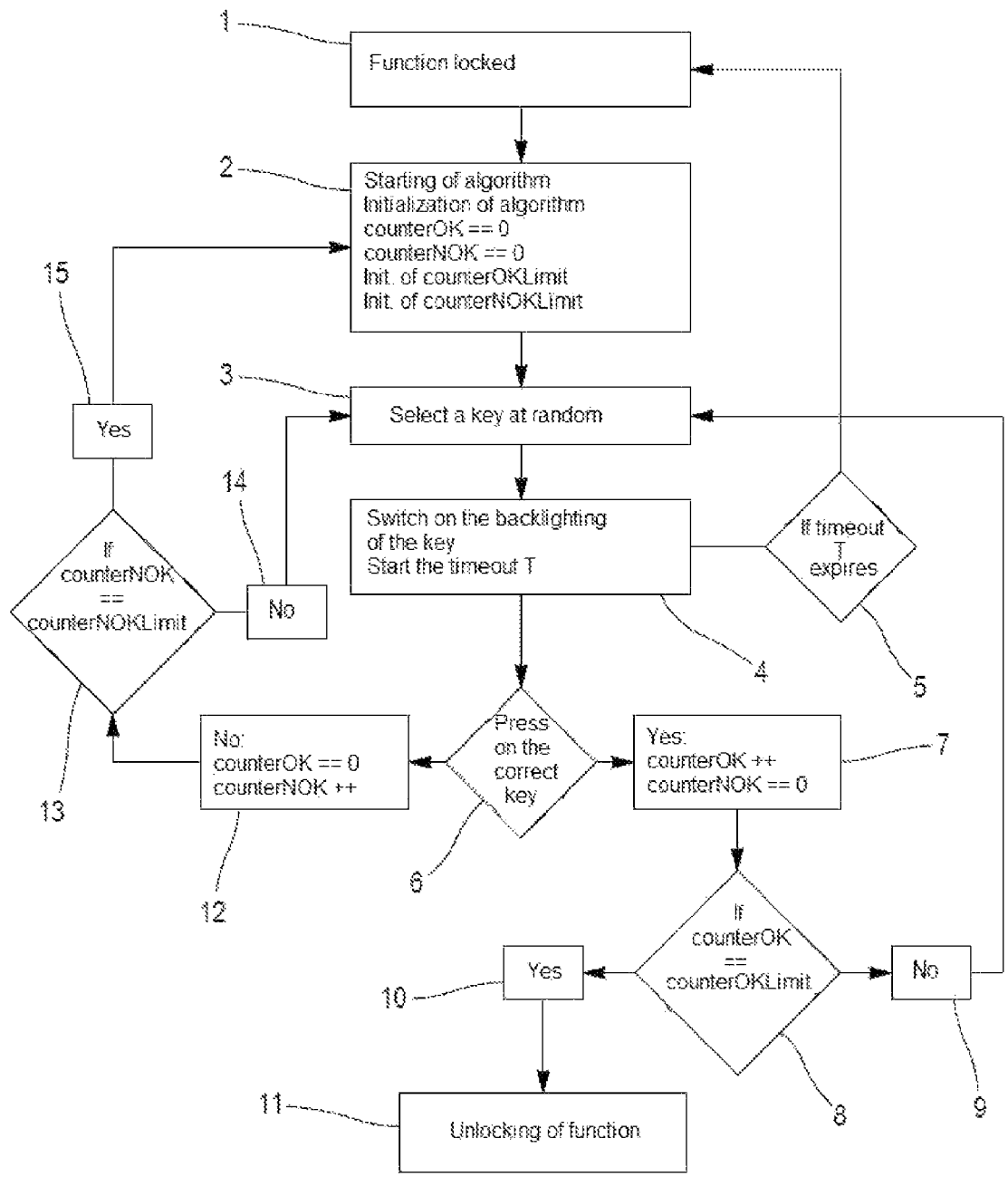
FIG. 4 is a view showing an unlocking algorithm for a mobile telephone keypad for the implementation of the method according to the invention.

In FIG. 4, in step 1, the function that the user wishes to activate is locked. This function can be the activation of the keypad of the telephone 16 in FIGS. 5 to 7. That is to say, the keypad keys on the telephone 16 are not active. The method according to the invention is implemented by the operating system on the mobile telephone 16 in the form of an algorithm that starts at step 2 in response for example to the user pressing any one of the keys. To this end, the algorithm according to invention is initialized by setting a counter counterOK to zero, setting a counter counterNOK to zero, defining a limit value counterOKLimit for counterOK, and defining another limit value counterNOKLimit for counterNOK. CounterOKLimit can be the length n of a sequence to be sent. As an example, n can equal three. This means that the sequence comprises three random instructions, i.e. three keys to validate.

Figure 5:
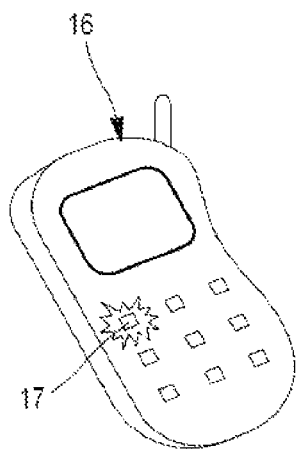
FIGS. 5 to 7 are views showing three keys backlit in succession according to the invention; an instruction can be the backlighting of one of these keys; the response expected in this case is the user pressing the key that is backlit.

In step 3, the algorithm according to the invention generates a random instruction, which is selecting the key 17 on the telephone 16. In step 4, the selected key is backlit and a timeout T is started. In FIG. 5, it can be seen that key 17 is backlit. The timeout T measures the period for which the selected key remains lit. If the user does not press the lit key during the period T, the timeout T expires in step 5 and the algorithm returns to the initial status, mechanism locked.

If during the period T a response is sent (here, a key is pressed), in step 6, the system checks that the response is valid (here, if it is key 17 or not).

Figure 6:
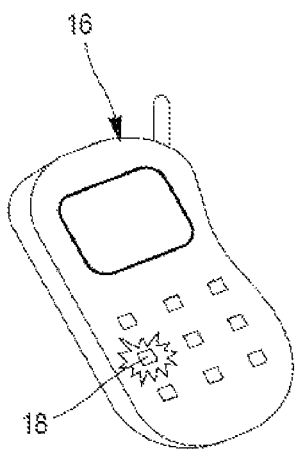
Figure 7:
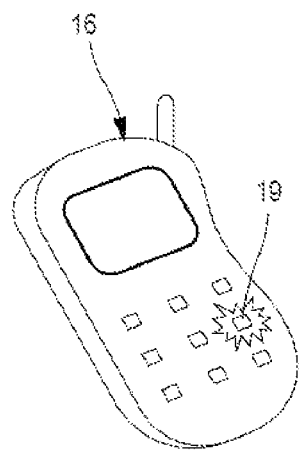

If step 6 is affirmative, counterOK is incremented during step 7 and counterNOK is kept at zero. Then, in step 8, the system checks whether counterOK has reached the limit value counterOKLimit. If this is not the case, in step 9, the system returns to step 3 to randomly select another key, 18 for example, then 19 as can be seen in FIGS. 6 and 7. For each key 18 and 19, steps 3, 4, 6, 7, 8 and 9 are carried out. When the three keys 17, 18 and 19 are pressed by the user in response to backlighting, counterOK reaches its limit value of three and the system then goes on to step 10 and then step 11 to unlock the keypad.

If step 6 is negative, counterNOK is incremented in step 12 and counterOK is kept at zero. Then, in step 13, the system checks whether counterNOK has reached the limit value counterNOKLimit. If this is not the case, in step 14, the system returns to step 3 to randomly select a new key. This new key is the first in a set of three. It is the first instruction in the sequence according to the invention. The algorithm starts again, taking into account the failure that occurred at step 6. If there are several failures and a limit value counterNOKLimit is reached, then in step 15 the algorithm is reinitialized with in particular new counterOKLimit and counterNOKLimit values.

Of course, the invention is not limited to the examples which have just been described and numerous adjustments can be made to these examples without exceeding the scope of the invention. The application of the present invention can be envisaged for the activation of any function of an appliance, particularly to validate a command such as a missile firing command for example. The visual instruction can therefore be the backlighting of a key on a mechanical keypad or on a touch screen, or an LED (light-emitting diode) indicating which key to press, for example, an LED placed near each key.

The invention claimed is:

1. A method of activating a mechanism including an interface device by means of an instruction sequence {xi, . . . , xn} of a length n given to a user, who must validate this sequence to activate said mechanism, the method comprising: randomly determining the instruction sequence {xi, . . . , xn}, defining a counter with a limit for a number of invalid responses and a counter with a limit for a number of valid responses using a processing unit associated with the mechanism, and for each instruction xi, the method includes the steps of:
    (a) sending an instruction xi to the user via the interface device;
    (b) receiving a response yi from the user using thwe interface device;
    (c) analyzing the response for validation of instruction xi; wherein the response yi is said to be a valid response when yi is a valid response for xi and the time elapsed between the sending of xi and the receipt of yi is shorter than a set period deltai; and an invalid response when yi is not a valid response for xi or the time elapsed between the sending of xi and the receipt of yi is equal to or greater than the set period deltai, wherein the mechanism is not activated;
    (d) sending a next instruction, if any after validation of xi; and
    (e) activating the mechanism when at least the last instruction in an instruction sequence sent is a valid response, and a counter with a number of consecutive valid responses is equal to the counter with the limit of valid responses; and
wherein if at least one response is invalid and a counter with a number of invalid responses is not equal to the counter with a limit for a number of invalid responses, determining a new instruction sequence {xi. . . xn} and performing each of the steps a)-e).

2. The method according to claim 1, wherein each instruction is determined randomly just before it is sent.

3. The method according to claim 1, wherein n has a range [$n_1$, $n_2$] where $n_1$ is greater than or equal to 2.

4. The method according to claim 1, wherein said length n is randomly determined.

5. The method according to claim 1, wherein at least one instruction $x_i$ is a visual instruction.

6. The method according to claim 1, wherein at least one instruction $x_i$ is an audio instruction to the user.

7. The method according to claim 1, wherein at least one response $y_i$ is a response of contact with the interface device.

8. The method according to claim 7, wherein at least one response $y_i$ is a response of contact by selection of a key on the interface device.

9. The method according to claim 1, wherein the instruction sequence {$x_i$, . . ., $x_n$} comprises a series of keys on a keypad associated with the interface device, with the sending of an instruction of the series consisting of indicating a corresponding key by the emission of light.

10. The method according to claim 9, wherein the emission of light is the backlighting of the corresponding key or the lighting of a light-emitting diode designating the corresponding key.

\* \* \* \* \*